United States Patent [19]

Murray

[11] Patent Number: 5,035,441
[45] Date of Patent: Jul. 30, 1991

[54] TRAILER HITCH ALIGNMENT DEVICE
[75] Inventor: Donald W. Murray, Ft. Worth, Tex.
[73] Assignee: Spectra Technologies Inc., Arlington, Tex.
[21] Appl. No.: 511,844
[22] Filed: Apr. 20, 1990

Related U.S. Application Data

[63] Continuation of Ser. No. 344,020, Apr. 27, 1989, abandoned.
[51] Int. Cl.⁵ .............................................. B60D 1/40
[52] U.S. Cl. ..................................... 280/477; 33/286; 116/28 R; 403/13
[58] Field of Search .................... 280/477; 403/13, 14; 248/160, 205.2, 206.5, 231; 33/264, 286, 288; 116/28 R

[56] References Cited

U.S. PATENT DOCUMENTS

| | | | |
|---|---|---|---|
| 3,159,917 | 12/1964 | Whitehead | 33/46 |
| 3,201,144 | 8/1965 | Smyser | 280/477 |
| 3,363,318 | 1/1968 | Folkins et al. | 33/46 |
| 3,418,628 | 12/1968 | Fenner | 340/52 |
| 3,420,549 | 1/1969 | Robinson | 280/477 |
| 3,675,947 | 7/1972 | Blagg | 280/500 |
| 3,702,029 | 11/1972 | Anderson, Jr. | 280/477 X |
| 3,702,029 | 11/1972 | Anderson, Jr. | 280/477 |
| 3,720,000 | 3/1973 | Schlegel | 33/264 |
| 3,747,958 | 7/1973 | Hackett | 280/477 |
| 3,765,703 | 10/1973 | Voelkerding et al. | 280/477 |
| 3,773,356 | 11/1973 | Eichels et al. | 280/477 |
| 3,818,599 | 6/1974 | Tague | 280/477 |
| 3,858,966 | 1/1975 | Lowell, Jr. | 350/307 |
| 3,866,328 | 2/1975 | Alexander et al. | 33/264 |
| 3,879,062 | 4/1975 | Miller | 280/477 |
| 3,889,384 | 6/1975 | White | 33/264 |
| 3,901,536 | 8/1975 | Black | 280/477 |
| 3,918,746 | 11/1975 | Lehtisaari | 280/477 |
| 3,924,257 | 12/1975 | Roberts | 340/282 |
| 4,012,056 | 3/1977 | Christensen | 280/477 |
| 4,017,977 | 4/1977 | Light et al. | 33/1 LE |
| 4,054,302 | 10/1977 | Campbell | 280/477 |
| 4,057,266 | 11/1977 | Duncan et al. | 280/475 |
| 4,065,147 | 12/1977 | Ross | 280/477 |
| 4,156,972 | 6/1979 | Vankreuelen | 280/477 X |
| 4,169,610 | 10/1979 | Paufler | 280/477 |
| 4,173,353 | 11/1979 | Steele | 280/477 |
| 4,187,494 | 2/1980 | Jessee | 340/52 R |
| 4,192,526 | 3/1980 | Myers | 280/477 |
| 4,199,756 | 4/1980 | Dito | |
| 4,205,453 | 6/1980 | Steele | 33/180 AT |
| 4,226,438 | 10/1980 | Collins | 280/477 |
| 4,254,968 | 3/1981 | Del Vecchio | 280/477 |
| 4,285,138 | 8/1981 | Berry | 33/264 |
| 4,416,466 | 11/1983 | Park | 280/477 |
| 4,417,748 | 11/1983 | Dortch | 280/477 |
| 4,432,563 | 2/1984 | Pitcher | 280/477 |
| 4,511,159 | 4/1985 | Younger | 280/477 |
| 4,537,416 | 8/1985 | Linaburg | 280/478 R |
| 4,541,183 | 9/1985 | McConnell | 116/28 R X |
| 4,552,376 | 11/1985 | Cofer | 280/477 |
| 4,560,183 | 12/1985 | Cook | 280/477 |
| 4,583,481 | 4/1986 | Garrison | 116/28 R |
| 4,621,432 | 11/1986 | Law | 280/477 X |
| 4,627,634 | 12/1986 | Coleman | 280/477 |
| 4,666,176 | 5/1987 | Sand | 280/477 |
| 4,708,359 | 11/1987 | Davenport | 280/477 |
| 4,723,788 | 2/1988 | Suter | 280/477 |
| 4,741,111 | 5/1988 | Emerick | 33/264 |
| 4,781,394 | 11/1988 | Schwartz et al. | 280/477 |

Primary Examiner—Charles A. Marmor
Assistant Examiner—Mitchell Bompey
Attorney, Agent, or Firm—Johnson & Gibbs

[57] ABSTRACT

A visual aid to assist a driver in maneuvering a towing vehicle toward a trailer or other vehicle to be towed for precisely aligning the hitch components of the two vehicles. The device mounts only to the towed vehicle and includes an integral bumper member to protect the vehicles should the driver back too far. The device is adaptable to all conventional trailer hitch components and is simple and easy to use. It comprises a universal adaptor, a sighting mast and a strap for attaching the assembly to the towed vehicle. The mast can be mounted in the vertical position for viewing through the back window or at an angle to extend laterally past the side of the tow vehicle to allow the driver to view the mast even if rearward visibility is blocked through the rear window of a tow vehicle. The mast is disturbed from its rest position when the hitch components are aligned. The device is also designed such that it can be mounted to a vehicle to provide an early warning signal to the driver that he is closely approaching an object.

8 Claims, 5 Drawing Sheets

TRAILER HITCH ALIGNMENT DEVICE

This is a continuation of application Ser. No. 07/344,020, filed Apr. 27, 1989, now abandoned.

BACKGROUND OF THE INVENTION

1. Field of the Invention

The present invention relates to automotive accessories and, more particularly, to a trailer or towed vehicle hitch alignment apparatus.

2. History of the Prior Art

Towed vehicles such as boat trailers, camping trailers and many other trailers or vehicles for general or specific use are common in the prior art. Towing and towed vehicles are typically coupled with a ball and socket hitch. The ball is usually mounted at the rear of the towing vehicle and the socket is mounted at the front of the towed vehicle. Precise alignment of the ball and socket is required to allow the two to be coupled. Aligning these components without assistance from an outside observer is frequently a difficult and frustrating experience. The ball and socket become blocked from the driver's view and even an experienced driver has to get out of the towing vehicle a number of times to check the relative position of the hitch components or risk a collision of the two vehicles. The closing distance of the two vehicles is more difficult to judge than the lateral, or left-right alignment. The inability of the driver to accurately judge the closing distance relative to the two vehicles often results in a collision causing damage to one or both vehicles.

A number of hitch alignment guides have been devised. All of these devices have components which mount both to the towing vehicle and to the towed vehicle. U.S. Pat. No. 3,702,029 issued to Anderson, U.S. Pat. No. 3,818,599 issued to Tague and U.S. Pat. No. 4,541,183 issued to McConnell are examples of devices consisting of vertical rods connected to both vehicles. These rods must be viewed through the rear window of the towing vehicle when backing up to a towed vehicle or trailer to provide assistance to the driver. U.S. Pat. No. 4,621,432 issued to Law describes a device consisting of a vertical rod mounted to the towed vehicle and a fork-like sighting member mounted to the towing vehicle. U.S. Pat. No. 4,065,147 issued to Ross describes a guide rod mounted to the trailer that extends toward the tow vehicle and actually touches its rear window at a required pre-placed mark to indicate proper alignment. U.S. Pat. No. 4,156,972 issued to Vankrevelen describes a device which consists of two sighting rods, one connected to the towing vehicle and the other connected to the towed vehicle. These rods can be mounted in the vertical position or in the horizontal position to extend laterally past the side of the tow vehicle to allow the device to be seen if rearward visibility is blocked.

U.S Pat. No. 4,627,634 issued to Coleman describes a device which consists of two sighting rods. One rod mounts to the tow vehicle and the other mounts to the towed vehicle or on the ground in a predetermined spot if rearward visibility is blocked. All of the above inventions require a mark or member to be placed on the towing vehicle or on both the towing and towed vehicles.

SUMMARY OF THE INVENTION

The present invention recognizes the demand for an improved trailer hitch alignment guide to provide a visual aid to the driver sighting rearward through the towing vehicle or sighting to the side of the towing vehicle if rearward visibility through the vehicle is blocked to assist the driver in maneuvering a towing vehicle during a hitching operation without assistance from another person. The invention recognizes the demand for a device with an adaptor which universally mounts to the bottom surface of a towed vehicle mounted hitch component because this surface is common to all conventional hitch types. The invention recognizes the demand for a bumper feature to protect the vehicles should they collide. The invention also recognizes the demand for an early warning distance device to alert the driver he has backed far enough which is adaptable to other than towed vehicles.

An object of the invention is to provide a simple easy to use apparatus which is mounted only to the towed vehicle in which a single sighting mast provides a visual aid to the driver for precise longitudinal alignment.

Another object of the invention is to provide approximate lateral alignment if the mast is installed in the vertical position and precise lateral alignment if the mast is installed to extend past the side of the vehicle.

Another object of the invention is to provide a universal adaptor which adjustably mounts to the towed vehicle or to other than towed vehicles where a distance guide is needed. The adaptor when mounted to a towed vehicle extends adjustably forward toward the towing vehicle to provide a probe which touches the towing vehicle when the driver has backed far enough for engagement.

Another object of the invention is to provide a removable bumper member to protect the vehicles should the driver back too far.

Another object of the invention is to provide a single sighting mast having an adjustable mast bumper/marker element to be used as a sighting aid or an additional bumper. The adjustable bumper/marker can be positioned so that it is barely visible as viewed down the side of the tow vehicle when the mast is installed in the adaptor so as to extend laterally past the side of the vehicle. This will aid the driver in aligning the vehicle in the lateral direction.

Another object of the invention is to provide a means for the above described sighting mast and adjustable bumper to be used to correctly adjust the height of the hitch mounted on the towed vehicle with respect to the height of the ball on the towing vehicle.

Another object of the invention is to provide an adjustable strap of sufficient length to allow the assembly to be universally mounted to hitches or other parts of vehicles which would not scratch the vehicle.

Another object of the invention is to provide a mast assembly which can be easily broken down into several short sections or is of a telescoping configuration for easy storage.

Another object of the invention is to provide a means for the adaptor to be easily removable when not in use and to provide a means for attaching the short mast sections described above for storage purposes.

Still another object of the invention is to provide an assembly which is simple, inexpensive to manufacture and is rugged and durable.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

Figure 1:
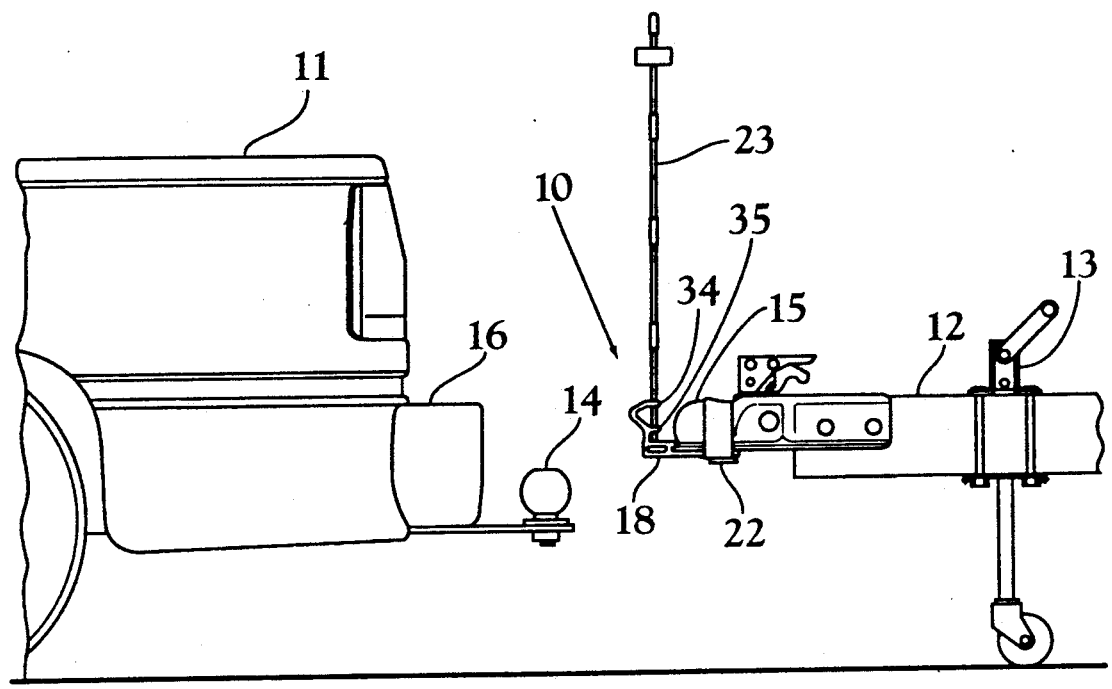
FIG. 1 is a side elevation view of the towing vehicle and a towed vehicle showing one embodiment of the invention removably mounted to the towed vehicle.

Referring first to FIG. 1, there is shown one embodiment of a trailer hitch alignment device constructed in accordance with the principles of the present invention. The hitch alignment device 10 comprises an adapter 18 which supports a sighting mast 23 and is attached to the towed vehicle or trailer 12 by an adjustable strap 22. It should be noted that the terms "trailer" and "towed vehicle" are used interchangeably throughout to refer to any structure which is positioned behind a towing vehicle and towed therefrom. The adaptor 18 is referred to herein as an "universal adaptor" since it mounts directly below the socket portion of virtually any trailer mounted hitch component 15. The ball hitch component 14 is mounted to the vehicle bumper 16 in a conventional arrangement. The vehicle 11 for illustration purposes is a pickup truck. However, it will be understood that this invention can be used with any towing and towed vehicles including, but not limited to, automobiles, trucks, motor homes, vans, all types of trailers, mobile homes, boat trailers, other automobiles, etc.

Figure 2:
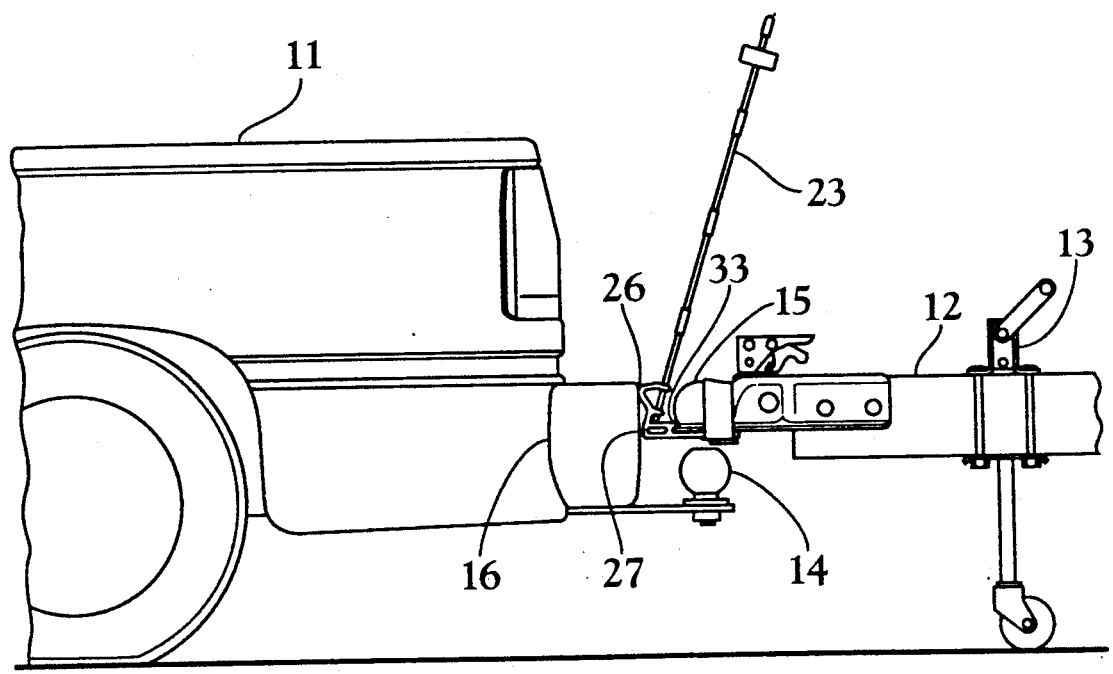
FIG. 2 is a side elevation view of a towing vehicle and a towed vehicle showing an embodiment of the invention removably mounted to the towed vehicle at the point of alignment where the mast is disturbed from its rest position.

FIG. 2 illustrates the point of alignment of the ball 14 and the socket 15 portion of the hitch components wherein the adapter probe 26 contacts the vehicle bumper 16 and disturbs the mast 23 from its rest position signaling the driver that the components are aligned. It can be seen in this figure that the adapter bumper surfaces 27 and 33 will prevent damage to the vehicles 11 and 12 should the driver back too far.

Figure 3:
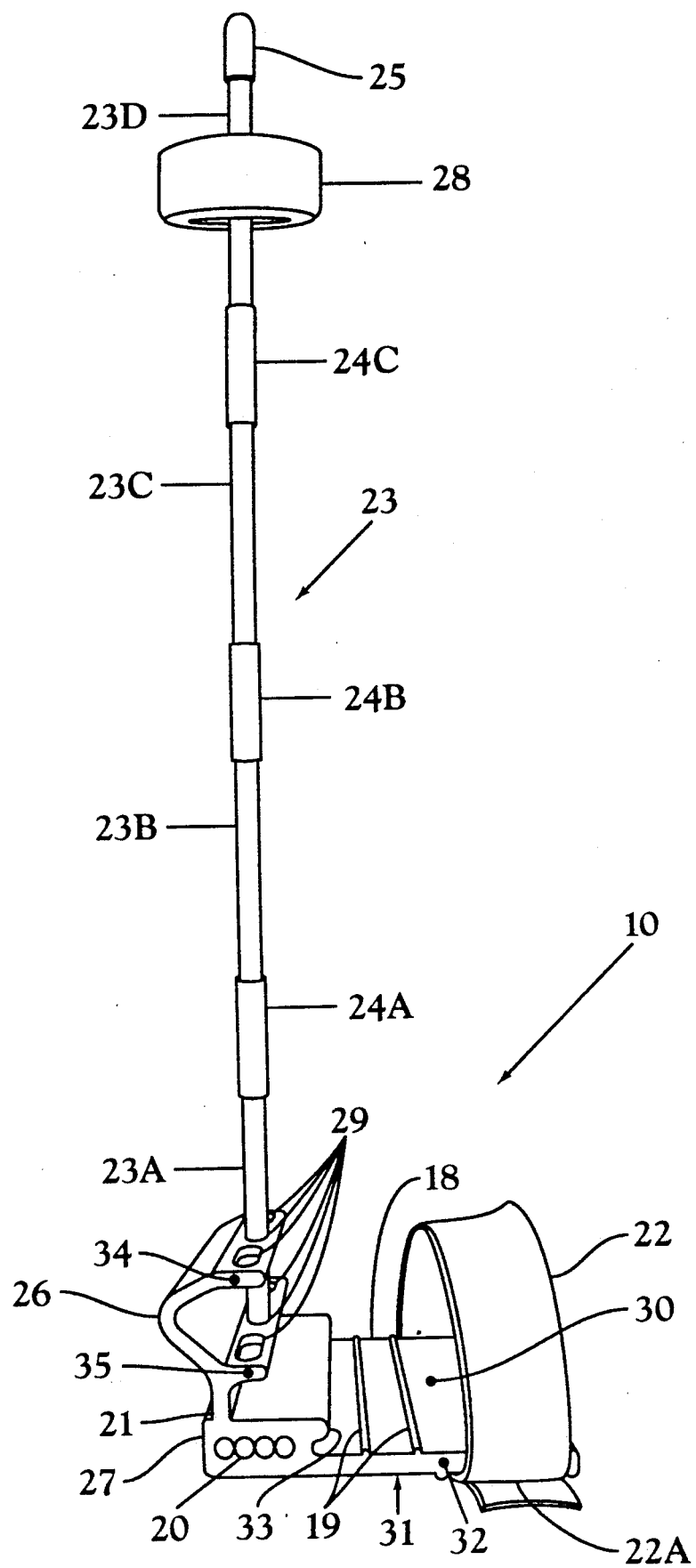
FIG. 3 is a perspective view of the alignment device in the assembled position.

FIG. 3 illustrates the preferred embodiment of the alignment device 10 in the assembled configuration. Shown herein are a universal adaptor 18, an assembled sighting mast 23, an adjustable bumper/marker 28 (described in more detail below), and an adjustable strap 22. The universal adaptor 18 consists of a substantially planar surface on the top 30 and bottom 31 edges of the adaptor base 32 to provide a mating surface for placing the universal adapter against the bottom surface of a trailer mounted hitch component. A forward bumper surface 27 is provided to protect the tow vehicle while an interior bumper surface 33 is provided to protect the towed vehicle. A flexible, or hinged section 21, pivotally connects the bumper surface 27 to a forward extending probe 26. The probe 26 provides a forward contact point that engages the tow vehicle when it has backed the proper distance. This engagement causes the upper 34 and lower 35 mast mounting legs to rotate about the flexible section 21. A set of holes 29 is formed in the upper 34 and lower 35 mast mounting legs for securing the mast 23 in the select position, which may be vertical, or at several other angles. A set of holes 20 is provided between the bumper surfaces 27 and 33 for receiving the short mast sections 23a, 23b, 23c, and 23d. Distance guide marks 19 are located on surface 30 or 32 to provide a reference mark for correct positioning of the universal adapter on a trailer. The adaptor 18 may be made of rubber, plastic or other flexible material or made from a rigid material with provisions for mounting the pivotal section 21 and the bumper surfaces 27 and 33 which are preferablY made from a pliable material.

Still referring to FIG. 3, the mast 23 consists of four mast sections 23a, 23b, 23c, and 24d, three ferrules 24a, 24b, 24c and a protective end cap 25. The ferrules 24a, 24b and 24c are permanently attached to the mast sections 23a, 23b and 23c respectively. The protective end cap is permanently attached to the mast section 23d. A fiberglass rod is the preferred material for the mast sections because of its strength, durability and low cost. The fiberglass rod also typically has a shiny surface which will reflect the back-up lights and brake lights of a tow vehicle, which will greatly aid a driver performing a nighttime hitching operation. Other materials such as lightweight aluminum tubing or dowel rod could be used.

Referring still to FIG. 3, adjustable strap 22 is of sufficient length to wrap around a trailer or other vehicle components and attach back to itself in region 22a to securely mount the adaptor to the desired vehicle. A hook and loop type fastener is a preferred material for the strap connector 22a, however, other suitable designs and materials may be used (e.g. buckles, clamps). In the preferred embodiment, the adjustable bumper/marker 28 is made of a rubber or other pliable material and is of sufficient size to be easily seen through a rear view mirror. The bumper/marker 28 can be positioned on the mast 23 so as to contact the tow vehicle or it can be used as a sighting aid.

OPERATION

Initially setting up for the hitching operation, the tow vehicle should be positioned in relatively close position as shown in FIG. i wherein the tow vehicle 11 and the towed vehicle 12 are far enough apart to allow a person to walk between the two vehicles.

Figure 4:
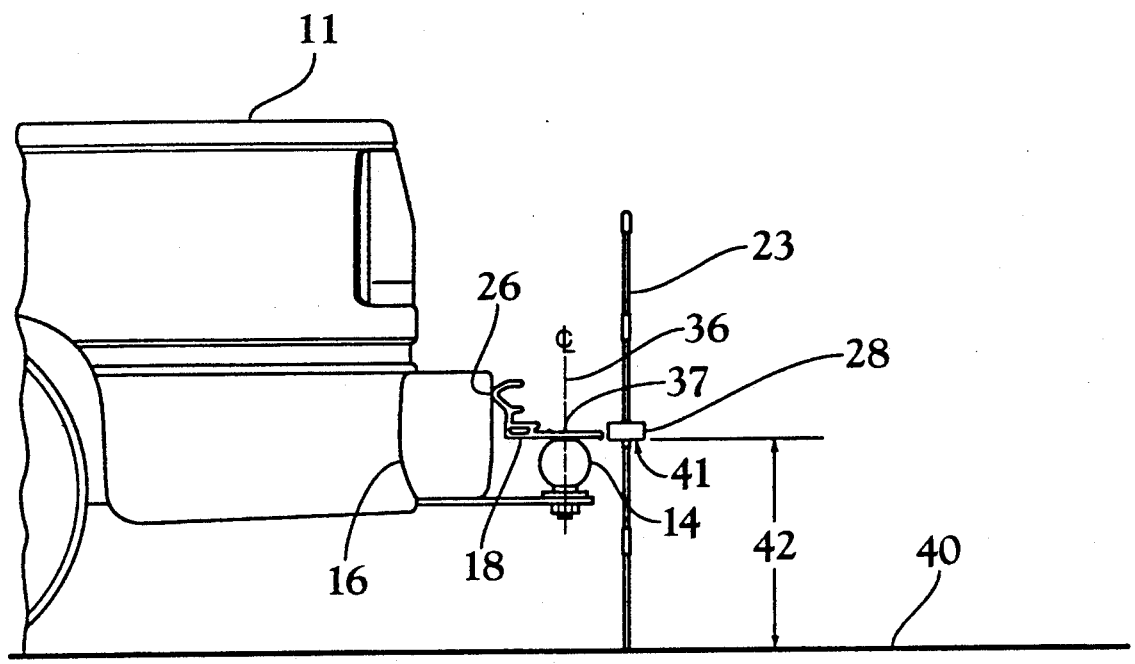
FIG. 4 is a side elevation view showing the positioning of the adaptor to determine the correct mounting position on the towed vehicle.

Positioning of the adaptor 18 on the towed vehicle 12 first involves determining the correct horizontal distance between the hitch ball 14 and the vehicle bumper 16 as illustrated in FIG. 4. The adaptor 18 is positioned directly above the ball 14 with the adaptor probe 26 touching the vehicle bumper 16 or possibly another portion of the vehicle. Note the positioning mark 37 located directly above the vertical center-line 36 of the ball 14. The adapter 18 is placed under the socket portion of the towed vehicle hitch component 15 with the previously noted mark 37 positioned directly under the center-line 38 of the socket 15 a shown in FIG. 5. The strap 22 is tightly wrapped around the towed vehicle 12 to securely attach the adaptor 18.

Figure 5:
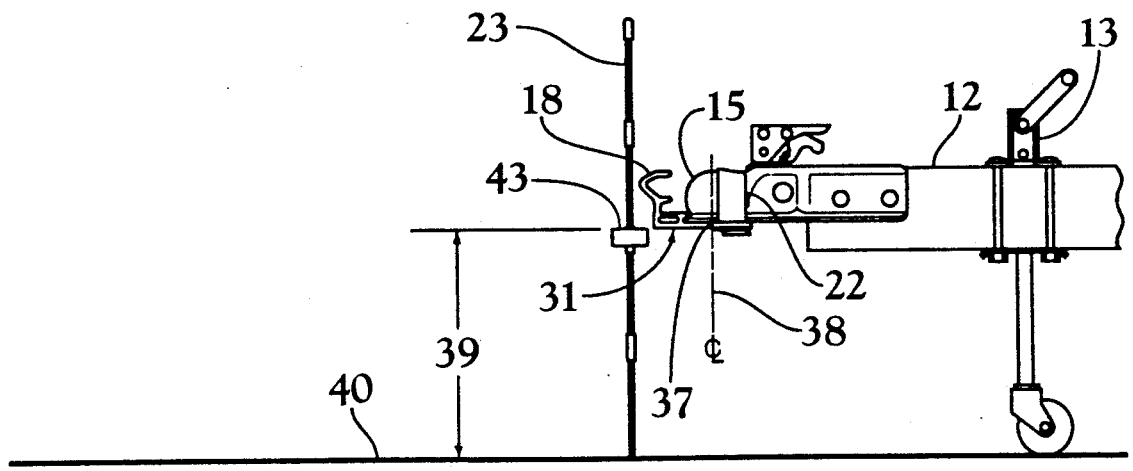
FIG. 5 is a side elevation view showing the mounting position of the adaptor on the towed vehicle and the positioning of the hitch height of the towed vehicle.

Positioning of the towed vehicle hitch component 15 the correct distance 39 above the ground 40 is illustrated in FIG. 4 and FIG. 5. The mast 23 is placed close to the hitch ball 14. The lower surface 41 of bumper/marker element 28 is positioned a distance 42 above the ground 40 where it is even with the top of the hitch ball 14 as shown in FIG. 4. The mast 23 is placed in front of the adapter 18 and the bottom surface 31 positioned even with the top surface 43 of the bumper/marker element 28 using the jack 13 or other suitable means.

Figure 6:
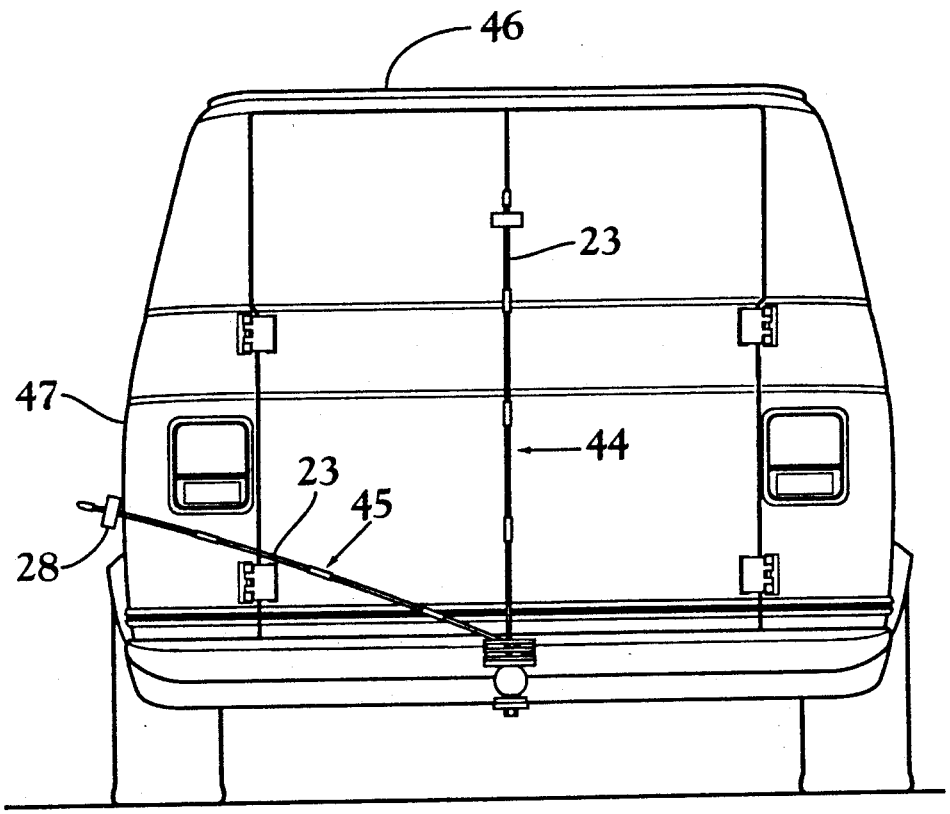
FIG. 6 is a rear elevation view of a vehicle and the alignment device showing the optional positioning of the mast in the adaptor and the positioning of the bumper/marker element.

The mast 23 is then inserted into the adaptor 18 which is strapped on the towed vehicle 12 as shown in FIG. 1. The mast 23 should be inserted through the upper 34 and lower 35 mast mounting legs to firmly support the mast 23. FIG. 6 illustrates two possible positions for mounting the mast 23. The vertical position 44 will provide the driver with a visual aid sighting rearward through the vehicle. If precise lateral alignment is required or if rearward visibility through the tow vehicle 46 is blocked, the mast 23 can be installed in position 45 to extend past the side 47 of the towing vehicle 46. The bumper/marker element 28 should be adjusted to align with the side 47 of the tow vehicle to give the driver a precise alignment guide to be viewed along the side 47 of the towing vehicle 46. In this manner, a single mast 23 can provide both lateral and rearward alignment With ample accuracy.

The towing vehicle 11 may then be backed to the towed vehicle 12 as shown in FIG. 2 until the mast 23 is disturbed from the rest position indicating that the hitch components are in precise alignment. Remove the alignment device 10 and lower the towed vehicle 12 using the jack 13 or other means and complete the hitching operation.

Figure 7:
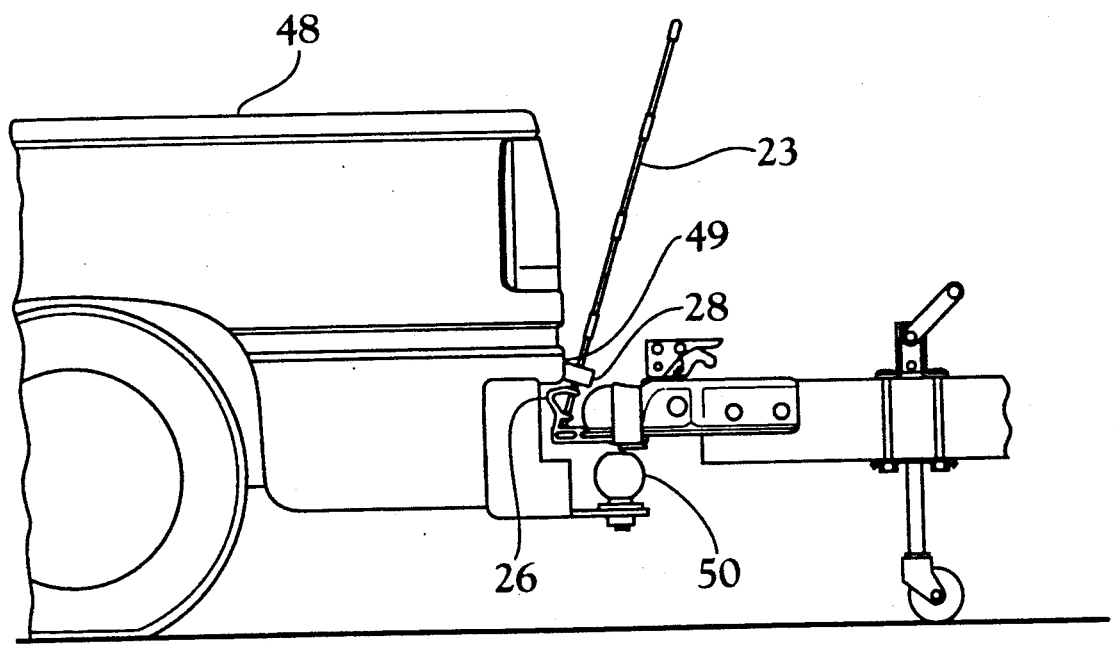
FIG. 7 is a side elevation view showing the point of alignment with a different towing vehicle and hitch combination in which the adjustable bumper/marker element contacts the towing vehicle instead of the adaptor probe.

FIG. 7 illustrates the positioning of the bumper/marker element 28 to prevent the mast 23 from contacting the vehicle 48 in some towing vehicle combinations. In some applications the rearmost portion 49 of the towing vehicle 48 extends to almost directly above the hitch ball 50 which would allow the mast 23 to contact the towing vehicle surface 49 instead of the adaptor probe 26.

Figure 8:
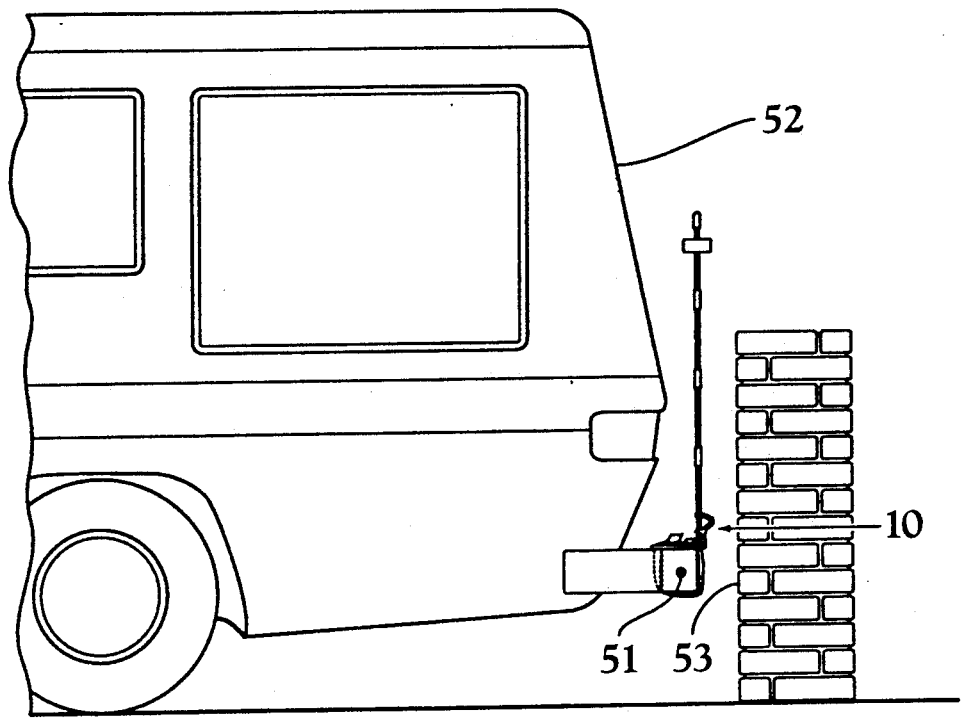
FIG. 8 is a side elevation view of the alignment device mounted to a motor home which is backing up to an object where the mast is disturbed from its rest position signaling the driver that the object is close.
Figure 9:
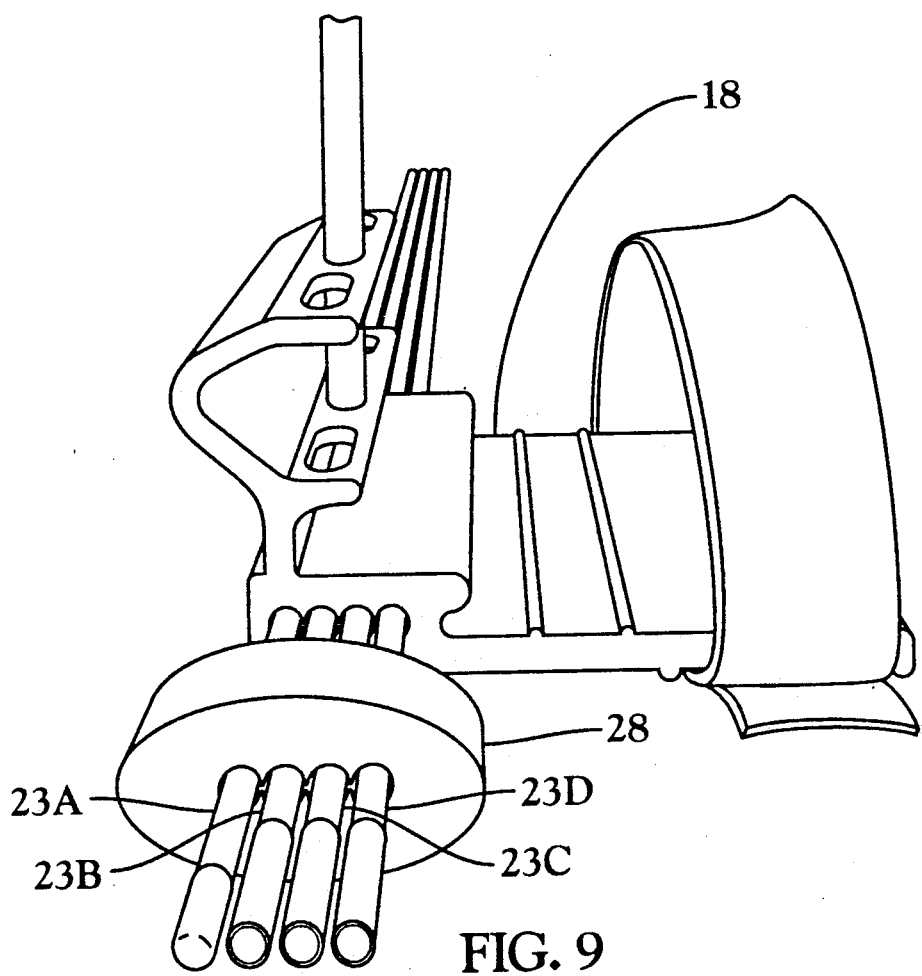
FIG. 9 is a perspective view of the alignment device with the mast sections attached to the adaptor for storage.

FIG. 8 illustrates another preferred embodiment of the invention in which the alignment device 10 is attached to the rear bumper 51 of a vehicle 52 to act as an early warning device to alert a driver that an object 53 is nearing. The vehicle 52 in this illustration is a motor home but the alignment device 10 could be easily adapted to other vehicles. FIG. 9 illustrates the short mast sections 23a, 23b, 23c, 23d inserted into the universal adaptor 18 for easy storage and to prevent them from becoming lost. The bumper/marker 28 is inserted over the mast sections also.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved trailer hitch alignment device of the type wherein at least one sighting member is provided for securement to the towed vehicle above a hitching element thereon, the improvement comprising an adapter constructed for securement to said hitching device, said adapter comprising an elongate base region adapted for matingly engaging said hitching device, means for securing said base region to said hitching device, a frontal body section having a lower bumper region adapted for extending outwardly of said hitching device, and a probe section upstanding from said bumper and extending forwardly thereof in pivotal relationship therewith and adapted for sensing the position of a towing vehicle in relationship thereto, and a mast adapted for the mountable coupling to said probe.

2. The apparatus as set forth in claim 1 wherein said probe further includes means for securing said mast thereto, said means comprising first and second apertures formed therein in generally vertical alignment therethrough.

3. The apparatus as set forth in claim 1 wherein said mast comprises a plurality of interlocking sections adapted for upstanding from said probe.

4. The apparatus as set forth in claim 1 wherein said adapter is constructed of flexible material.

5. The apparatus as set forth in claim 4 wherein said adapter is constructed of moldable, flexible material and comprises a unitary construction of flexible configuration.

6. The apparatus as set forth in claim 1 wherein said bumper is further constructed with a plurality of apertures adapted for receiving said mast therein.

7. The apparatus as set forth in claim 1 wherein said securement means comprises a strap adapted for extending around said towed vehicle and securing said base member thereto.

8. The apparatus as set forth in claim 1 wherein said probe comprises a generally C-shaped section having a neck region depending therefrom, said neck region upstanding from said bumper section and pivotally connected thereto, said C-shaped region further having apertures formed therethrough in generally vertical registry therewith for receiving said mass therein, whereby engagement of said probe by said towing vehicle causes said mast to deflect.

* * * * *